United States Patent [19]
Thompson

[11] Patent Number: 5,187,808
[45] Date of Patent: Feb. 16, 1993

[54] REPEATER SITE FAILURE DETECTOR IN COMMUNICATION SYSTEM

[75] Inventor: Michael J. Thompson, Plantation, Fla.

[73] Assignee: Motorola, Inc., Schaumburg, Ill.

[21] Appl. No.: 609,320

[22] Filed: Nov. 5, 1990

[51] Int. Cl.$^5$ .............................................. H04Q 7/00
[52] U.S. Cl. ...................................... 455/33.1; 455/8
[58] Field of Search ................... 455/8, 10, 15, 33, 34, 455/52, 54, 63, 67, 89; 379/58, 59, 60

[56] References Cited

U.S. PATENT DOCUMENTS 4,414,661 11/1983 Karlstrom ............................ 455/33

Primary Examiner—Reinhard J. Eisenzopf
Assistant Examiner—P. Sobutka
Attorney, Agent, or Firm—M. Mansour Ghomeshi

[57] ABSTRACT

A communication unit (114) operates in a communication system (100). The communication unit (114) communicates with a central communication controller via one of a plurality of a communication controllers (104, 108, or 112) that transmits information signals containing its identification along with other information. The communication unit (114) receives and determines the signal strength (RSS) of these information signals. A controller (412) monitors changes in the signal strength of the received information signals over time and determines whether the signal strength has fallen below a predetermined level at a rate of change higher than a predetermined rate. Such sharp fall in signal strength is communicated to a circuit which attempts to access a new channel after waiting for a random amount of time.

20 Claims, 4 Drawing Sheets

REPEATER SITE FAILURE DETECTOR IN COMMUNICATION SYSTEM

TECHNICAL FIELD

This invention relates generally to radios operating in communication systems and more specifically to radios operating in communication systems having several repeaters.

BACKGROUND

In a communication system, covering a wide geographical area is accomplished by the use of repeaters scattered according to the prevailing terrains. The repeaters are basically used to extend the range of transmission to and from the radios operating in such a communication system. The repeaters transmit information signals constantly so as to inform their respective radios of their identification. These signals are received by the radios where their strength is evaluated and based on this strength the radios determine if they are about or have already left the zone of a specific repeater. Upon weakening of the received signal strength of the information signal the radio scans the airwaves for another strong information signal in search of a new repeater. Upon a successful scan the radio shifts to the new frequency and accesses the new repeater. Since the probability of a large number of radios simultaneously moving out of one zone to another is very low, channel collision will seldom occur due to this movement of radios. However, if the weakening of the signal is due to the failure of a repeater a number of radios will attempt to register on an adjacent repeater site resulting in channel collision on the new site. This collision results in no radio being able to register and therefore greatly reducing the channel throughput. It is clear that a need exists for a radio and a method to successfully distinguish between situations when a radio moves out of the range of a repeater and when a repeater fails to operate.

SUMMARY OF THE INVENTION

Briefly, according to the invention, a communication unit operating in a communication system is disclosed. The communication unit communicates with a central communication controller via one of a plurality of a communication controller that transmits information signals containing its identification along with other information. The communication unit receives and determines the strength of these information signals. A controller monitors changes in the signal strength of the received information signals over time and determines whether the signal strength has fallen below a pre-determined level at an unacceptably high rate. Such sharp decline in signal strength is communicated to a circuit which attempts to access a new channel after waiting for a random amount of time.

In other aspect of the present invention the controller of the communication unit monitors the signal strength of the received information signals over time and determines whether the signal strength has gradually dropped below a pre-determined level. Such gradual drop in the signal strength is communicated to a circuit which attempts to access a new channel without any further delay.

DETAILED DESCRIPTION OF THE PREFERRED EMBODIMENT

Figure 1:
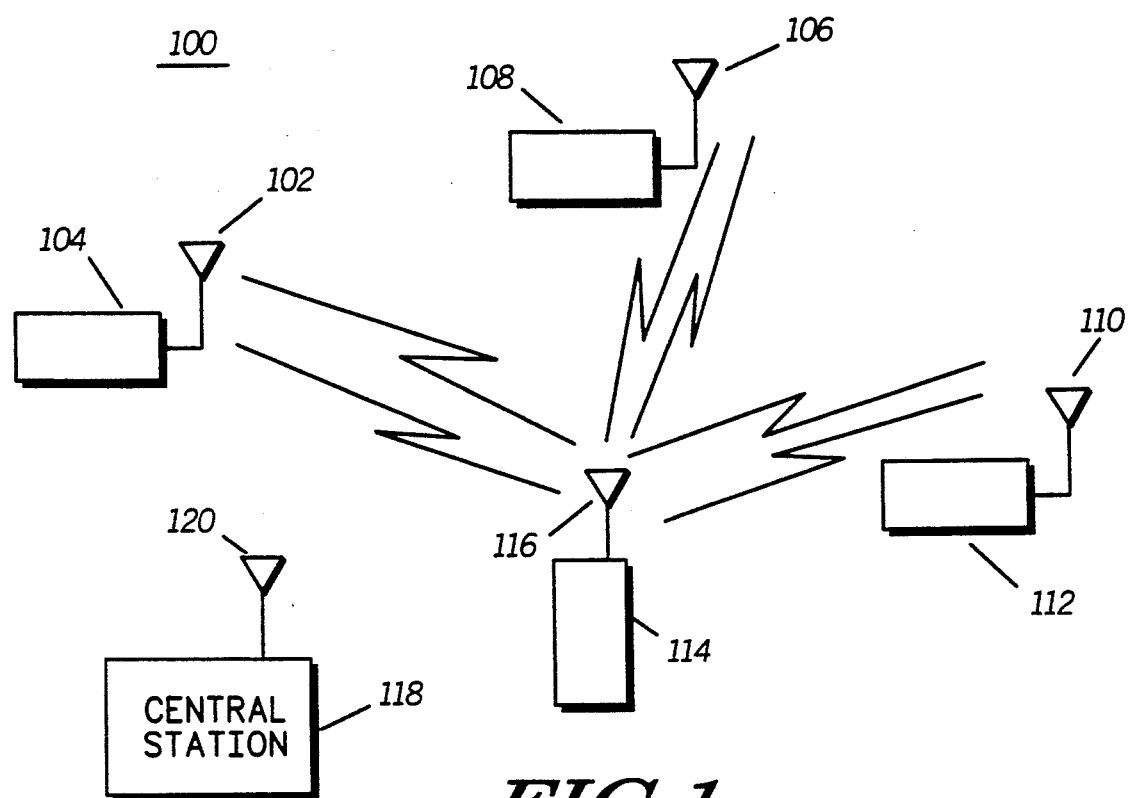
FIG. 1 shows a multi-repeater site communication system in accordance with the present invention.

Referring to FIG. 1, a communication system 100 is shown in accordance with the present invention. The communication system 100 which may be a trunked system includes three communication controllers (repeater sites) 104, 108, and 112 with their associated antennas 102, 106, and 110 respectively. These communication controllers 104, 108, and 112 may be communication translators or transceivers and are geographically located to cover the communications between a communication unit 114 and a central communication controller 118 over a desired area. The communication system 100 may include a plurality of communication units such as; portable and mobile radios. The central communication controller 118 communicates to the communication controllers 104, 108, and 112 utilizing telephone lines, dedicated lines, or microwave lines via techniques well known in the art. The signals from the central communication controller 118 reach the communication unit 114 via any one of the communication controllers 104, 108, or 112 depending on the location of the communication unit 114. Furthermore, the repeaters 104, 108, and 112 transmit information signals either constantly or periodically. These information signals are used by the receiving communication units in determining the specific zone they are in. Additionally these information signals are used by receivers to determine whether a communication controller has failed or a receiver has roamed out of the coverage area of that repeater in accordance with the principles of the present invention.

Figure 2:
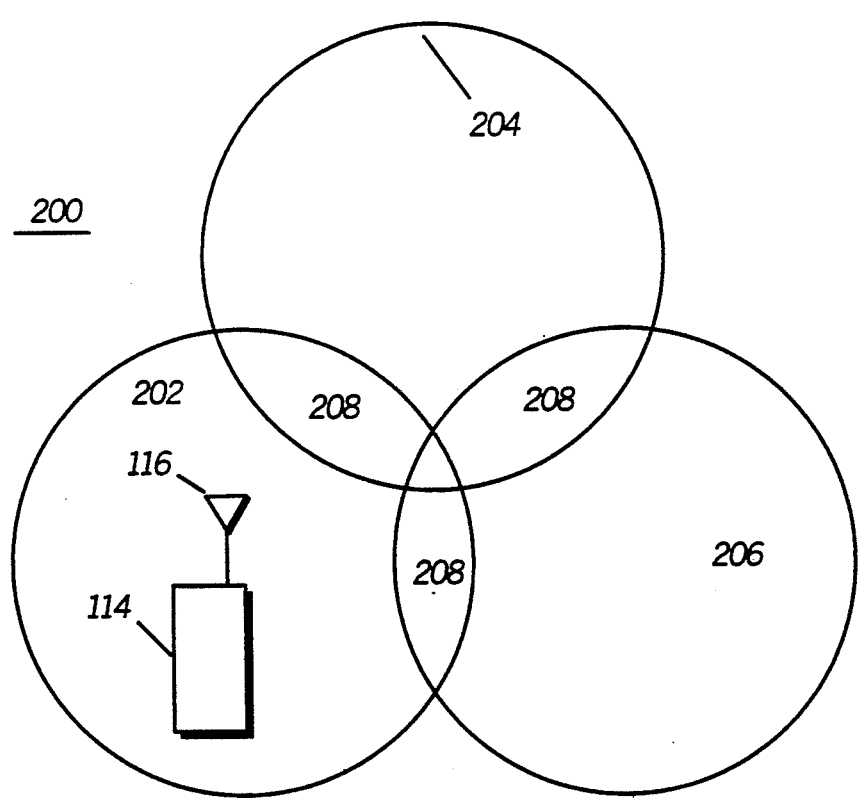
FIG. 2 shows the coverage zone of the communication system of FIG. 1.

Referring now to FIG. 2, the coverage area of the communication system 100 is shown. The areas 202, 204, and 206 show the coverage zones of the communication controllers 104, 108, and 112 respectively. In communication systems such as 100 the terrain of a coverage area dictates the use of extra communication controllers. These controllers are strategically located to provide sufficient coverage over that particular area. In these systems the coverage zones of two or more communication controllers overlap. The areas shown by 208 are the overlapping zones of the communication system 100. A communication unit in the areas 208 may communicate to the central communication controller 118 via any one of the overlapping communication controllers. Indeed the received signal strength of the RF signal carrying information signals weakens as a communication unit moves closer to these overlapping zones 208.

Each of the communication controllers 104, 108, and 112 transmits an information signal carrying identification and other valuable information belonging to that specific communication controller. This information signal may be a data signal such as OSWs (outbound signalling words) used in trunked systems. This information signal tells the communication unit 114 which one of the communication controllers 104, 108, or 114 it will use in communicating with the central communication controller 118. For discussion purposes we will assume that the radio 114 is in the area 202 and therefore uses the repeater 104 to communicate to the central station 118. Similar discussions apply to areas 204 and 206. The received signal strength (RSS) of the information signal varies as the communication unit 114 roams around in the area 202. The closer the communication unit 114 gets to the antenna 102 the stronger the received information signal and therefore the higher the level of RSS will be.

Figure 4:
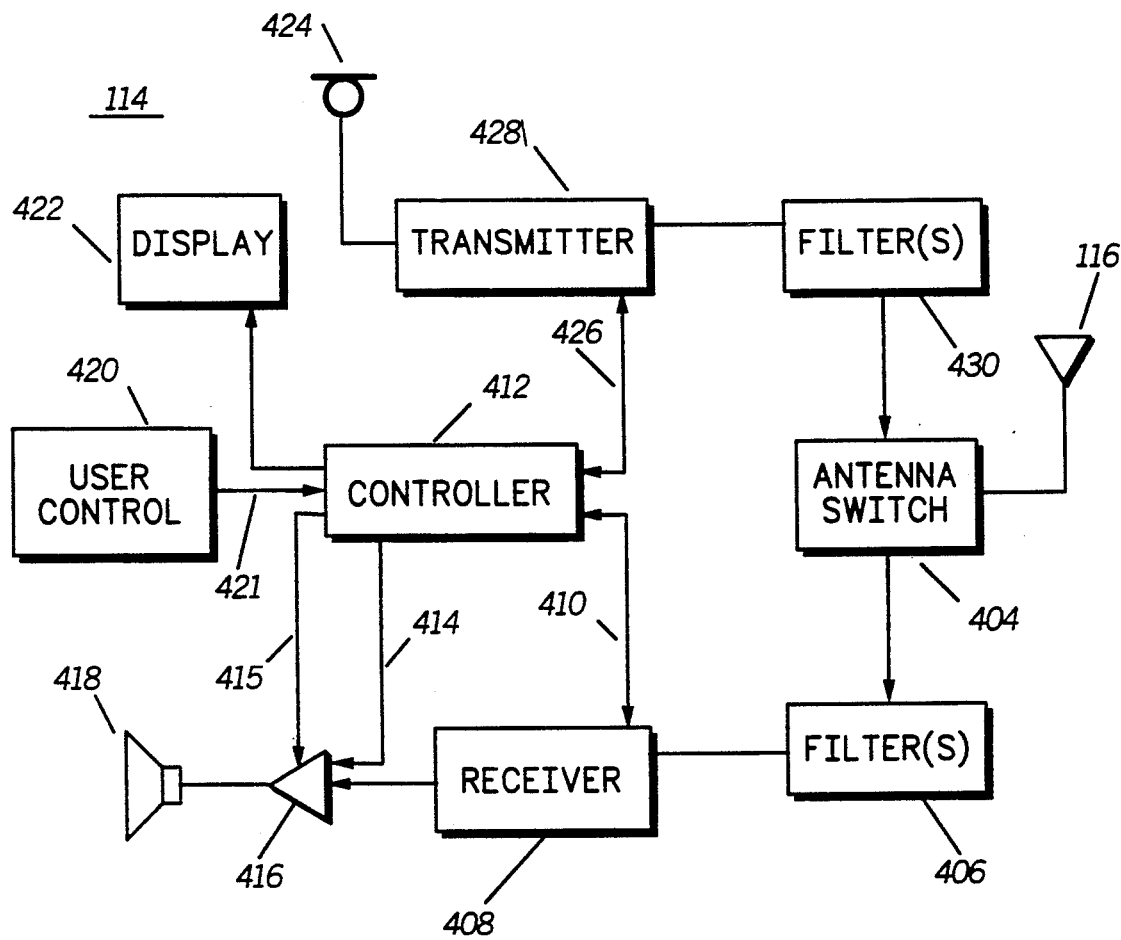
FIG. 4 is a block diagram of a communication unit in accordance with the present invention.

Referring now to FIG. 4, a block diagram of the elements of the communication unit 114 is shown in accordance with the present invention. The communication unit (radio) 114 includes an antenna switch 404 that can selectively couple the antenna 402 to either a receiver 408 via filter(s) 406 or a transmitter 428 via filter(s) 430. The receiver 408 provides the means for receiving information signals.

To receive a message, a radio frequency (RF) signal modulated with intelligence including information signals is routed from an antenna 116 to the receiver 408 via the filter(s) 406. The information signals carried by the RF signal are originated by the communication controller 104. The receiver 408 demodulates the incoming RF signal and submits portions of it to the controller 412 for further processing. The controller 412 decodes and determines the RSS of the information signal. The controller 412 continues to monitor and compare changes in the level of the RSS to a pre-determined level. These changes are fetched and recorded in the memory of the controller 412. Any decline in the level of the RSS is compared to previously recorded levels in an effort to determine its rate of change. These comparisons provide the means for detecting when the RSS has sharply fallen below a pre-determined level or when it has fallen below a pre-determined level at a rate of change higher than a pre-determined rate. Such a sharp drop in RSS level or its high rate of change indicates that the communication controller 104 has failed. Upon the detection of a sharp fall the controller 412 communicates to the receiver 408 via the data line 410 a request to monitor the airwaves for signals from other communication controllers 108 and 112. The receiver 408 detects the presence of an information signal from a second communication controller if the communication unit 114 is in any of the overlapping zones 208. The receiver 408 notifies the controller 412 immediately upon any such detections. Consequently, the controller 412 commands the transmitter 428, via the data line 426, to access the newly detected communication controller after a random delay. The communication unit 114 continues its operation no later than this random delay and the delays associated with the normal operation of the communication system 100 including those required to check for fading and/or multipath conditions. Fading and multipath conditions are phenomena resulting in temporary loss of signal. Earlier is due to dead spots in a coverage area such as under a tunnel or trees or in a deep valley. The later is encountered when information signals reflected by buildings are duplicated resulting in corruption of such signals. Either one of these two conditions are temporary in communication systems and are well known in the art.

In the event that a second communication controller is not available, for instance; when the communication unit is not in the overlapping zones 208, the controller unit informs the user by displaying a message indicating no operation on the display 422. The random delay used by the controller 412 stops communication units operating in the same zone from transmitting access requests simultaneously thereby minimizing signal collisions. In other words without this random delay several transmitters will attempt to transmit access request signals at the same time causing signal collisions which results in secession of communication.

On the other hand the RSS level will drop gradually as the communication unit 114 roams out of the range of a communication controller. The controller 412 detects this decrease until it gradually falls below a pre-determined level. Subsequently, the controller 412 commands the receiver 408 to search for an information signal from a different communication controller. Once a new communication controller has been located the controller 412 directs the transmitter 428 to access and register to the newly detected communication controller without going through the random delay. The operation of the controller 412 pertaining to the principles of the present invention are better understood by the flow chart of FIG. 5 explained later.

In its other functions the controller 412 operates to alert the radio user of an incoming signal and proceeds to present the received message in a variety of ways depending upon the message type and optional features that may be enabled or disabled by the radio user. Thus the controller 412 may send an alert signal to an amplifier 416, via data line 414, to be presented to the radio operator via the speaker 418. After the alert, a voice message may be provided by the demodulator 408 to the amplifier 416 for presentation via the speaker 418. Data messages would follow the radio's address code to the controller 412 via data line 410. Such messages are subsequently analyzed by the controller 412 and if appropriate sent to a display 422 for presentation.

Communications from the communication unit 114 to the central communication controller 118 are handled by the transmitter 428. To transmit a signal, a voice message is routed from the microphone 424 to the transmitter 428 for transmission via the antenna 116 through filter(s) 430 and antenna switch 404. Data messages are processed by the controller 412 and are subsequently presented to the transmitter 428 for transmission via the antenna 116 through filter(s) 430 and antenna switch 404.

Figure 5:
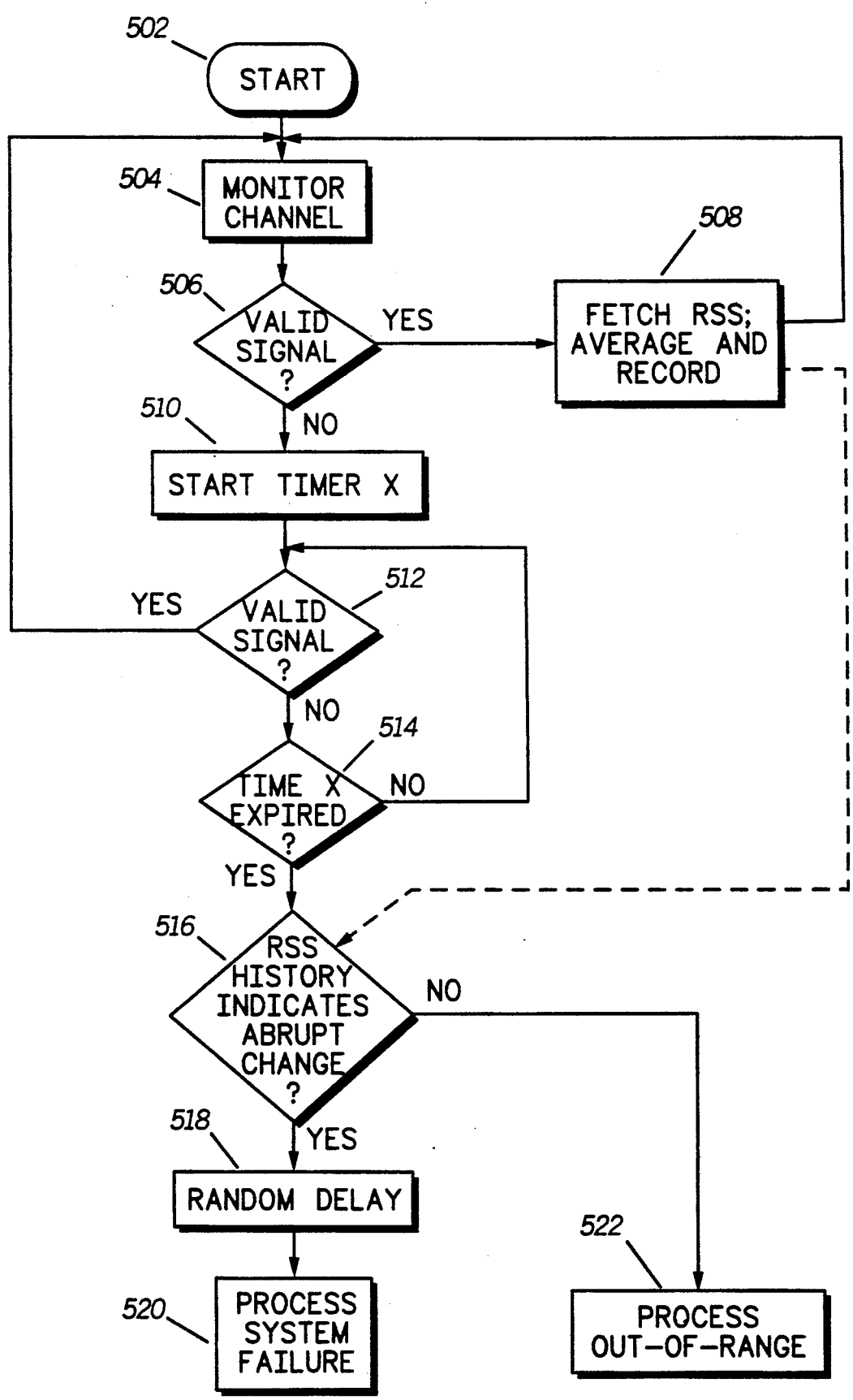
FIG. 5 is a flow chart of the operation of the receiver of the communication unit of FIG. 4 in accordance with the present invention.

Referring to FIG. 5 now, a flow chart of the operation of the controller 412 is shown in accordance with the present invention. From the start block 502 the controller 412 is in the monitor mode via the monitor RSS block 504. The monitor RSS block 504 is connected to a decision block 506 where the presence of a valid signal is determined. This may be accomplished by comparing the level of the RSS to a pre-determined level ($V_A$). $V_A$ is determined to be a sufficient level of RSS for the receiver 408 to be able to accurately decode the intelligence carried by the received RF signal. As the receiver 408 moves in and about a particular zone the level of the RSS varies, but remains within a valid and acceptable level (above $V_A$). The YES output of the decision block 506 which indicates that a valid signal has been received is connected to the block 508 where the RSS of the information signal is fetched, averaged, and recorded. The averaging is necessary to smooth out the RSS so as to better evaluate its trend and eliminate minor abrupt changes that are acceptable in an operational systems.

Figure 3A:
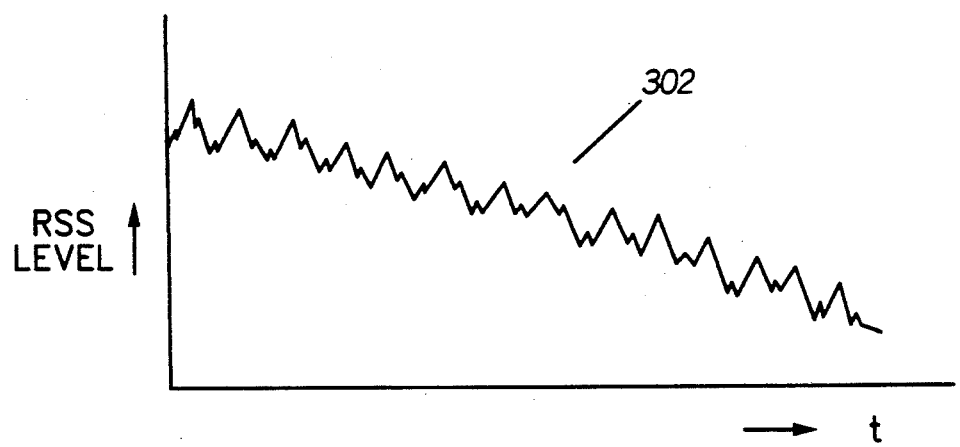
FIG. 3A is a plot of the received signal strength over time in a communication unit roaming out of the range of a repeater site.
Figure 3B:
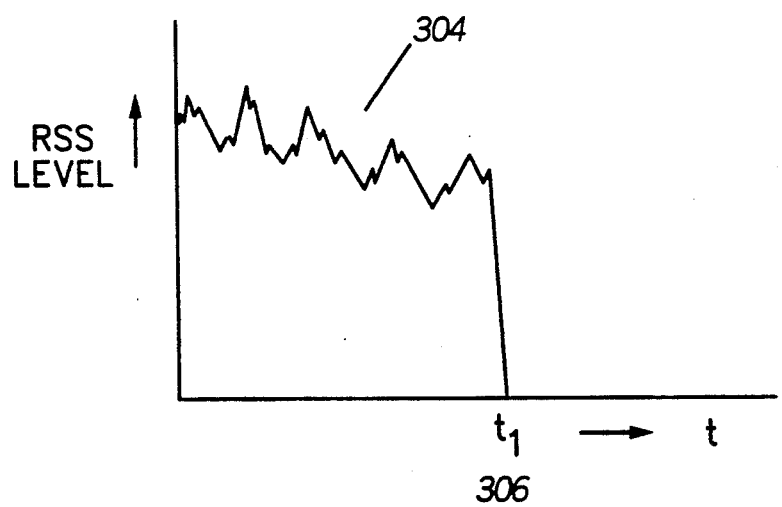
FIG. 3B is a plot of the received signal strength over time in a communication unit at the time of the failure of a repeater site.

FIG. 3A and 3B show a plot of the RSS level of the information signal over time when it drops gradually 302 and abruptly 304. The earlier being the result of the communication unit 114 roaming out of the coverage area of the repeater 104. while the later may be due to the total failure of the repeater 104. As can be seen from FIG. 3A the fluctuations in the RSS is not smooth over time. Indeed the RSS level continues to fluctuate over time for as long as it is monitored. Its prolonged trend is what is important and not its instantaneous jumps. It is therefore necessary to smooth out the curve for its better and more effective evaluation. In the event that the communication unit 114 is moving away from the repeater 104 the gradual drop in the RSS continues until it totally fades away which is concurrent with the communication unit 114 leaving the zone 202. Similarly it can be seen from FIG. 3B that the RSS normally varies over time in both directions until a sharp drop is experienced. This sharp drop may be the result of fading or multipath conditions. Another situation where a sharp drop in the level of the RSS is experienced is the failure of the repeater 104. The fading and multipath conditions are temporary and expected in some applications. The NO output of the decision block 506 is connected to a start timer X block 510. At the block 510 a timer X is reset to zero and starts to count. The timer X is used to minimize the effects of fading and/or multipath conditions.

The output of the start timer X 510 is connected to another condition block 512 where the validity of the incoming signal is once again checked. The YES output of the condition block 512 indicates that the received signal is once again valid and that the invalid signal detected by the condition block 506 was due to fading or multi-path conditions and should be ignored. Consequently the YES output of the condition block 512 is connected back to the monitor RSS block 504 where the cycle is restarted. The NO output of the condition block 512 is connected to a decision block 514 where the elapsed time of the timer X is checked. The NO output of the decision block 514 which indicates that the time X has not expired is looped back to the input of the decision block 512. This loop continues until the level of the RSS climbs above $V_A$ or time X expires. The later brings the operation to the YES output of the decision block 514 connected to yet another decision block 516. The decision block 516 determines if the absence of a valid signal detected by the blocks 506 and 512 is abrupt or gradual. The decision block 516 utilizes the history of the RSS of the information signal averaged and recorded by the block 508 to reach its conclusion. The dotted line 524 signifies a connection between the two blocks 508 and 516.

The NO output of the decision block 516 is connected to block 522 and indicates that the radio 114 has roamed out of the zone of a particular repeater. The process out-of-range block 522 monitors the availability of a new communication controller and registers on that new site using methods well known in the art. The YES output of block 516 is connected to a delay block 518. The delay block 518, using a random delay generator, generates a random delay before resuming the operation of the radio 114. The output of the random delay 518 is connected to block 520 where the failure of a particular communication controller is processed. Effectively if the radio 114 is in an overlapping area of repeaters (208) then it will register on a second repeater and continue operation. If, on the other hand, the radio 114 is not in an overlapping area 208 the user will be notified of system failure and operation ceases. The random delay generated by block 518 is the key in avoiding collision when a particular repeater fails. Collision of the RF signals would occur as a repeater fails to operate. Upon such a failure all the receivers in the zone of that communication controller detect an abrupt loss of valid signal and try to register or access a new channel causing collision. A random delay in each of the receivers minimizes such collisions and allows normal operation to continue.

Those skilled in the art will recognize that various modifications and changes could be made with respect to the above described invention, without departing from the spirit and scope of the invention as set forth. Therefore, it should be understood that the claims are not to be considered as limited to the particular embodiments set forth in the absence of specific limitations expressly incorporating such embodiments.

What is claimed is:

1. In a radio operating in a communication system, said communication system comprising, a plurality of communication controllers, a plurality of communication units, and a central communication controller, said communication controllers transmitting information signals, a method for distinguishing between the failure of one of said plurality of communication controllers and the roaming out of range of at least one of said plurality of communication units, comprising the steps of:

receiving said information signal;
   determining the signal strength of said received information signal;
   monitoring the rate of change in the received signal strength;
   first detecting when the signal strength of said received information signal falls below a pre-determined level
   second detecting when the rate of change of the signal strength of said received information signal is lower than a pre-determined rate of change; and
   accessing a second repeater of said plurality of repeaters in response to said second detecting.

2. The method of claim 1, further including the steps of:

third detecting when the rate of change of the signal strength of said received information signal is higher than a pre-determined rate of change, and
   accessing a second repeater of said plurality of repeaters not before a randomly defined time period has elapsed.

3. The method of claim 1, wherein said radio is operating in a communication system having a plurality of radios.

4. The method of claim 3, wherein said communication system is trunked.

5. The method of claim 1, wherein said radio comprises a mobile radio.

6. The method of claim 1, wherein said information signal comprises a data signal.

7. The method of claim 1, wherein said radio comprises a portable radio.

8. The method of claim 1, wherein said plurality of repeaters comprise communication translators.

9. A communication unit capable of communicating with a communication controller that transmits information signals, said communication unit comprising:
   means for receiving said information signals;
   means for determining the received signal strength of said information signals;
   control means for monitoring changes in the received signal strength over time and detecting when the received signal strength has sharply fallen below a pre-determined level, and
   accessing means responsive to said control means for accessing a different communication controller after a random amount of time has elapsed.

10. The radio of claim 9, further comprising:
    control means for monitoring changes in the received signal strength and detecting when the received signal strength has gradually dropped below a pre-determined level over time, and
    accessing means responsive to said control means for accessing a different communication controller.

11. The communication unit of claim 9, wherein said communication unit is operating in a communication system.

12. The communication unit of claim 11, wherein said communication system is trunked.

13. The communication unit of claim 9, wherein said communication unit comprises a mobile radio.

14. The communication unit of claim 9, wherein said communication unit comprises a portable radio.

15. The communication unit of claim 9, wherein said information signal comprises a data signal.

16. The communication unit of claim 9, wherein said repeaters comprise transceivers.

17. In a communication unit capable of communicating to a central communication controller via at least one of a plurality of communication controllers that transmit information signals, a method for avoiding transmission collisions due to the failure of one of said communication controllers, comprising the steps of:
    receiving said information signal;
    determining the signal strength of said received information signal;
    monitoring changes in the received signal strength over time;
    detecting the sharp fall of the received signal strength below a pre-determined level, and
    accessing a second channel a randomly defined time period after said detection.

18. The method of claim 17, further including the steps of:
    detecting the gradual drop of the received signal strength below a pre-determined level, and
    accessing a second repeater of said plurality of repeaters in response to said gradual drop.

19. A communication unit capable of communicating with a central communication controller via at least one of a plurality of communication controllers that transmit information signals, said communication unit comprising:
    means for receiving said information signal;
    means for determining the received signal strength of said information signal;
    control means for monitoring changes in the received signal strength over time and detecting when the received signal strength has sharply fallen below a pre-determined value;
    accessing means responsive to said control means for accessing a second repeater of said plurality of repeaters after a random amount of time has elapsed.

20. The communication unit of claim 19, further comprising:
    control means for monitoring changes in the received signal strength over time and detecting when the received signal strength has gradually dropped below a predetermined level over time, and
    accessing means responsive to said control means for accessing a second repeater of said plurality of repeaters.

* * * * *